United States Patent
Kalhan

(10) Patent No.: US 11,071,107 B2
(45) Date of Patent: Jul. 20, 2021

(54) CONTROL CHANNEL ARCHITECTURE WITH CONTROL INFORMATION DISTRIBUTED OVER MULTIPLE SUBFRAMES ON DIFFERENT CARRIERS

(71) Applicant: Kyocera Corporation, Kyoto (JP)

(72) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 69 days.

(21) Appl. No.: 16/528,294

(22) Filed: Jul. 31, 2019

(65) Prior Publication Data

US 2019/0357210 A1    Nov. 21, 2019

Related U.S. Application Data

(63) Continuation of application No. 13/703,871, filed as application No. PCT/US2010/039175 on Jun. 18, 2010, now Pat. No. 10,375,689.

(51) Int. Cl.
| | |
|---|---|
| H04W 72/04 | (2009.01) |
| H04L 27/26 | (2006.01) |
| H04W 28/06 | (2009.01) |
| H04L 1/00 | (2006.01) |
| H04W 56/00 | (2009.01) |

(Continued)

(52) U.S. Cl.
CPC ....... H04W 72/0446 (2013.01); H04L 5/0053 (2013.01); H04L 27/2602 (2013.01); H04W 28/06 (2013.01); H04W 56/00 (2013.01); H04W 56/0035 (2013.01); H04W 72/04 (2013.01); H04L 1/008 (2013.01); H04L 1/0072 (2013.01);

(Continued)

(58) Field of Classification Search
CPC ..... H04L 5/0053; H04L 5/0055; H04L 1/008; H04L 1/0001; H04W 72/04; H04W 28/06
See application file for complete search history.

(56) References Cited

U.S. PATENT DOCUMENTS

| | | |
|---|---|---|
| 2007/0076587 A1 | 4/2007 | Kwon et al. |
| 2008/0049690 A1 | 2/2008 | Kuchibhotla et al. |

(Continued)

FOREIGN PATENT DOCUMENTS

| | | |
|---|---|---|
| EP | 2139255 A1 | 12/2009 |
| KR | 1020070037916 | 4/2007 |
| WO | 2010013960 A2 | 2/2010 |

OTHER PUBLICATIONS

Abbas, S Syed Ameer, Geethu K.S., and S.J. Thiruvengadam; "Realization of Physical Downlink Control Channel (PDCCH) for LTE under SIS Environment using PlanAhead Tool and Virtex 5 FGPA"; International Journal of Emerging Technology and Advanced Engineering, vol. 2 Issue 4; Apr. 2012; Madhya Pradesh, IN.

*Primary Examiner* — Raj Jain

(57) ABSTRACT

Control information (126) related to the reception of data (128) within a subframe (116) is transmitted over multiple subframes (113, 116) over multiple carrier (107, 108) from communication system infrastructure (102). A controller (134) in a mobile wireless communication device (104) reconstructs the control information (126) received over multiple subframes (113, 116) based on at least some control information (130) in a first physical control channel (118) in a first subframe (113) transmitted over a first carrier (107) and at least some other control information (132) in a second physical control channel (120) in a second subframe (116) transmitted over a second carrier (108).

6 Claims, 6 Drawing Sheets

(51) Int. Cl.
    *H04L 5/00*    (2006.01)
    *H04L 1/02*    (2006.01)

(52) U.S. Cl.
    CPC .............. *H04L 1/02* (2013.01); *H04L 5/0007*
            (2013.01); *H04L 5/0023* (2013.01)

(56) References Cited

U.S. PATENT DOCUMENTS

| | | | |
|---|---|---|---|
| 2008/0085718 A1 | 4/2008 | Kuchibhotla et al. | |
| 2008/0160917 A1* | 7/2008 | Dominique | H04B 17/373 455/67.11 |
| 2009/0129268 A1 | 5/2009 | Lin et al. | |
| 2009/0232163 A1 | 9/2009 | Lee et al. | |
| 2009/0252075 A1 | 10/2009 | Ji et al. | |
| 2009/0270094 A1* | 10/2009 | Ito | H04W 74/002 455/434 |
| 2009/0316626 A1 | 12/2009 | Lee et al. | |
| 2010/0023830 A1 | 1/2010 | Wengerter et al. | |
| 2010/0034135 A1 | 2/2010 | Kim et al. | |
| 2010/0103891 A1 | 4/2010 | Okubo et al. | |
| 2010/0165931 A1 | 7/2010 | Nimbalker et al. | |
| 2010/0202373 A1* | 8/2010 | Chun | H04L 1/0027 370/329 |
| 2010/0202382 A1 | 8/2010 | Park et al. | |
| 2010/0246518 A1 | 9/2010 | Gheorghui et al. | |
| 2010/0290370 A1 | 11/2010 | Li et al. | |
| 2010/0317360 A1 | 12/2010 | McBeath et al. | |
| 2010/0322154 A1* | 12/2010 | Chen | H04W 99/00 370/328 |
| 2011/0044261 A1 | 2/2011 | Cai et al. | |
| 2011/0110315 A1 | 5/2011 | Chen et al. | |
| 2011/0110337 A1* | 5/2011 | Grant | H04L 1/0029 370/335 |
| 2011/0149760 A1* | 6/2011 | Shrivastava | H04L 5/006 370/252 |
| 2011/0164585 A1 | 7/2011 | Yu et al. | |
| 2011/0176507 A1 | 7/2011 | Yuk et al. | |
| 2011/0211537 A1 | 9/2011 | Sivanesan et al. | |
| 2011/0267997 A1 | 11/2011 | Seo et al. | |
| 2012/0002635 A1 | 1/2012 | Chung et al. | |
| 2012/0039180 A1 | 2/2012 | Kim et al. | |
| 2012/0087314 A1 | 4/2012 | Maeda et al. | |
| 2012/0155312 A1 | 6/2012 | Kim et al. | |
| 2012/0294694 A1 | 11/2012 | Garot | |
| 2013/0089068 A1* | 4/2013 | Kalhan | H04L 27/2602 370/330 |

* cited by examiner

CONTROL CHANNEL ARCHITECTURE WITH CONTROL INFORMATION DISTRIBUTED OVER MULTIPLE SUBFRAMES ON DIFFERENT CARRIERS

RELATED APPLICATIONS

The present application is a continuation of and claims priority to U.S. application Ser. No. 13/703,871, entitled "CONTROL CHANNEL ARCHITECTURE WITH CONTROL INFORMATION DISTRIBUTED OVER MULTIPLE SUBFRAMES ON DIFFERENT CARRIERS" and filed on Dec. 12, 2012; which is a national stage application of PCT/US2010/039175, entitled "CONTROL CHANNEL ARCHITECTURE WITH CONTROL INFORMATION DISTRIBUTED OVER MULTIPLE SUBFRAMES ON DIFFERENT CARRIERS" and filed on Jun. 18, 2010; which is related to International Patent Application Serial Number PCT/US2010/039185 entitled "CONTROL CHANNEL ARCHITECTURE WITH CONTROL INFORMATION DISTRIBUTED OVER MULTIPLE SUBFRAMES" and filed Jun. 18, 2010; all of which are assigned to the assignee hereof and hereby expressly incorporated by reference in their entirety.

BACKGROUND

The invention relates in general to wireless communication systems and more specifically to control signals in a wireless communication system.

Base stations in cellular communication systems provide communications services to wireless communication devices within geographical cells where each base station exchanges signals with wireless communication devices within an associated cell. The size and shape of each cell and, therefore, the coverage area of the base station are determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. In addition to data information, control signals are exchanged between the base stations and mobile communication devices. In some circumstances, control information is transmitted within a downlink control channel from a base station to a mobile communication where the control information indicates how data communication can be received such as information on demodulation, decoding, etc. Communication resources may be divided into frames including subframes. In conventional systems, control information regarding the reception of data in a subframe is transmitted in the same subframe as the data.

SUMMARY

Control information related to the reception of data within a subframe is transmitted over multiple subframes over multiple carriers from communication system infrastructure. A controller in a mobile wireless communication device reconstructs the control information received over multiple subframes based on at least some control information in a first physical control channel in a first subframe transmitted over a first carrier and at least some other control information in a second physical control channel in a second subframe transmitted over a second carrier.

DETAILED DESCRIPTION

Figure 1A:
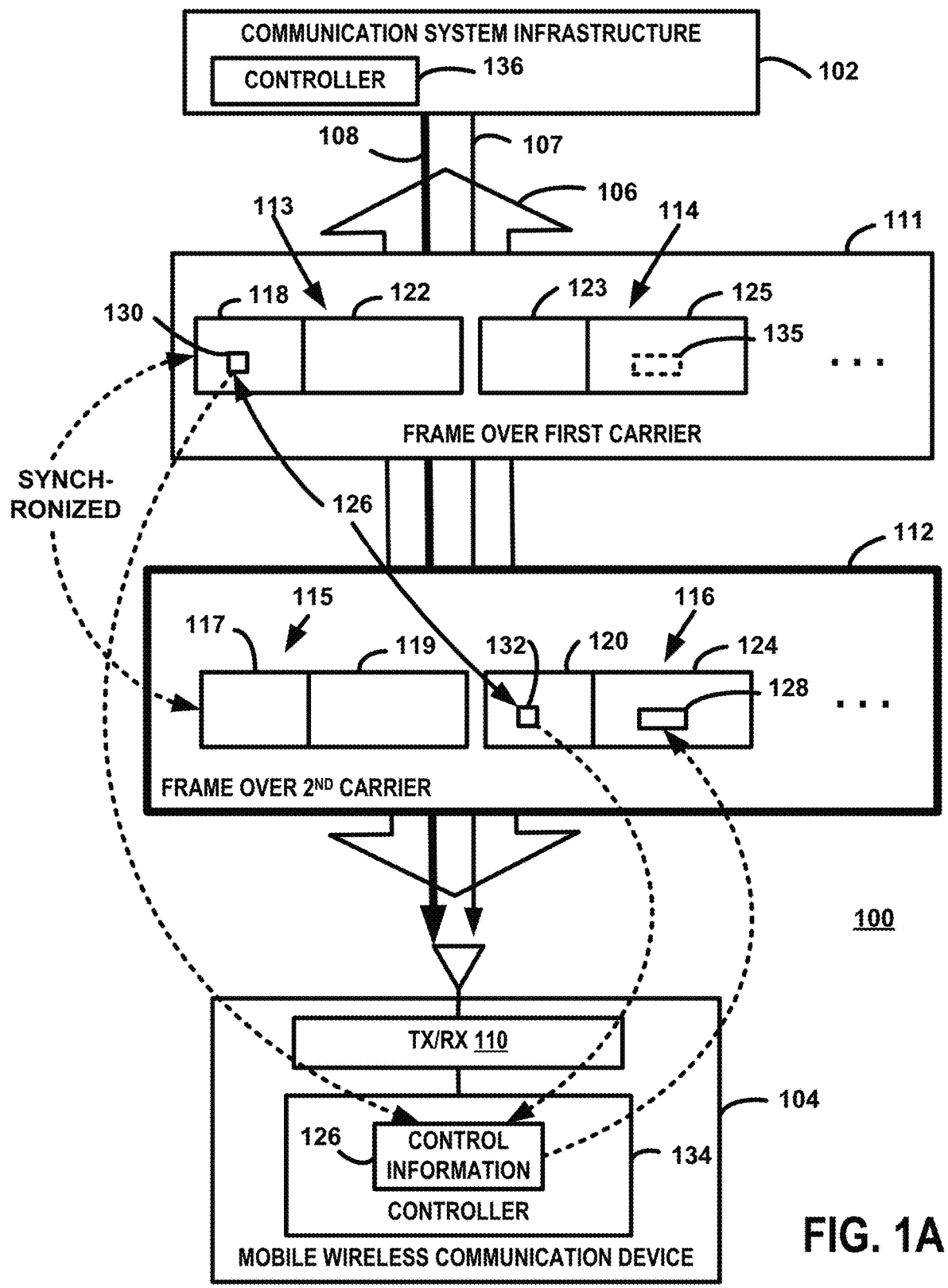
FIG. 1A is a block diagram of a communication system in accordance with an exemplary embodiment of the invention.

FIG. 1A is a block diagram of a communication system 100 in accordance with an exemplary embodiment of the invention. The communication system 100 may be implemented in accordance with any of numerous technologies and communication standards. For the examples discussed below, the system 100 operates in accordance with an orthogonal frequency division multiplex (OFDM) standard. The various functions and operations of the blocks described with reference to the communication system 100 may be implemented in any number of devices, circuits, and/or elements as well as with various forms of executable code such as software and firmware. Further, the reference to "first" and "second" components is made for identification purposes and does not necessarily indicate any relative timing information. For example, a second signal may be transmitted before, after, or at the same time as a first signal.

The system 100 includes communication system infrastructure 102 and at least one wireless communication device 104. The communication system infrastructure 102 includes at least one base station but may include several base stations and controllers connected through a backhaul. In most circumstances, several base stations are connected to a network controller through network infrastructure to provide wireless communication services to multiple wireless communication devices.

One or more wireless transceivers in the communication system infrastructure 102 exchange wireless signals 106 over at least two frequency carriers 107, 108 with a wireless transceiver 110 in the wireless communication device 104. Accordingly, the communication system infrastructure 102 includes one or more transmitters for transmitting wireless signals to the wireless communication device 104 which includes a receiver for receiving the signals. Transmissions from the communication system infrastructure 102 and from the wireless communication device 104 are governed by a communication specification that defines communication signaling, protocols, and parameters of the transmission. The communication specification may provide strict specifications for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for a physical downlink control channel from base stations to wireless communication devices. The control channel includes a broadcast control channel as well as control channels scheduled to specific wireless communication devices. In an OFDM based system, a physical channel can be defined by allocating specific frequency-time resources. The granularity of these resources depends on the specification and design of the system.

As discussed in further detail below, the transmission of frequency-time resources, sometimes referred to as resource elements, is defined within frames 111, 112. The frames 111, 112 are simultaneously transmitted over different frequency carriers 107, 108. In FIG. 1, the second carrier 108 and the frame 112 are represented with an arrow and box having heavier lines than the arrow and box representing the first carrier 107 and frame 111 in order to convey that the first frame 111 is transmitted over the first carrier 107 and the second frame 112 is transmitted over the second carrier 108. The first frame 111 transmitted over the first carrier 107 includes several subframes 113, 114 and the second subframe 112 includes several subframes 115, 116. Each subframe 113, 114, 115, 116 includes a physical control channel 117, 118, 120, 123 and a physical data channel 119, 122, 124, 125. The physical channels 117-125 of the two frames 111, 112 are different channels since the physical channels 117-125 of the two frames 111, 112 are transmitted at different frequencies. Although a particular implementation may further specify frequency, timing, and coding parameters for each base station and/or wireless communication device, conventional systems transmit control information and the related data for a wireless communication device 104 only within the same subframe.

In the examples discussed herein, however, the control information 126 related to data 128 in a subframe 116 is distributed over at least one other subframe 113 transmitted over a different frequency carrier 107. In one example, at least a first portion 130 of the control information 126 is transmitted over a first physical control channel 118 of a first subframe 113 in the first frame 111 transmitted over the first carrier 107 and at least a second portion 132 of the control information 126 is transmitted over a second physical control channel 120 of a second subframe 116 of the second frame 112 transmitted over the second frequency carrier 108, where the control information 126 facilitates reception of data 128 in the physical data channel 124 of the second subframe 116. The transceiver 110 in the wireless communication device 104 receives the subframes 113, 116 and a controller 134 reconstructs the control information 126 from at least some of the control information 130 in the first subframe 113 and at least some of the control information 132 in the second subframe 116. The control information 126 is used by the receiver of the transceiver 110 to receive the data 128 in the physical data channel 124 in the second subframe 116. Although the example discusses distributing the control information 126 over only two subframes, the technique may also be applied to more than two subframes. In some circumstances, the control information 126 is transmitted over the physical control channels of one or more subframes other than the subframe 116 including the data to which the control information 126 corresponds. Also, the second portion 132 of the control information may not be transmitted within the same subframe 116 as the subframe used for transmitting the data 128. For example, the control information 126 may provide information regarding the reception of data 135 in a subframe 114 other than the second subframe 116. For the example of FIG. 1, the data 135 is transmitted in a physical data channel 125 in a subframe in the first frame 111 and is illustrated with a dashed line box to indicate that the transmission of this data 135 is an alternative to transmitting the data 128 in the second subcarrier 116. Further, the first and second subframes may be transmitted simultaneously in some circumstances. Therefore, the control information is distributed over different subframes transmitted over different carriers and is received at the mobile communication device which uses the control information to receive the data.

As discussed herein, therefore, control information 126 is the complete control information required to be received by the wireless communication device 104 in order to receive the data 128 to which the control information 126 corresponds. Before transmission, the control information 126 may be coded, or otherwise processed, to reduce errors. Consequently, some redundancy of information may occur between subframes and/or within a subframe. In some circumstances, the wireless communication device 104 may be capable of only accurately receiving some of the control information transmitted within each subframe but is capable of reconstructing all of the control information 126 required to receive the data 128. The control information 126 may also be scrambled before or after being separated into the multiple portions.

A controller 136 in the communication system infrastructure 102 separates the control information 126 into a first portion 130 and a second portion 130 and assigns the portions to two or more subframes that may be transmitted over different carriers 107, 108. The separation is typically performed as a mapping of error coded control information across the subframes after the control information is error coded. The mapping results in the first portion of the control information 130 mapped to the first physical control channel 118 of the first subframe 113 and the second portion of the control information 132 mapped to the second physical control channel 120 of the second subframe 116. The second subframe 116 also includes the data 128 within the data channel 124. The frame 112 having the control information distributed over the subframes 114, 116 is transmitted to the wireless communication device 104. Based on at least some of the received information of the two or more portions of control information 130, 132, the controller 134 in the wireless communication device 104 reconstructs the control information 126. The received and decoded control information is used to receive the data 128.

As discussed herein, the control information 126 is information or data related to communication between the base station 102 and the wireless communication device 104. The control information 126 is transmitted within control channels. Accordingly, although a control channel may be defined across multiple subframes in conventional systems, the examples herein discuss transmitting information over multiple subframes using either multiple control channels or a single control channel defined over multiple subframes.

Transmission of the multiple portions of the control information 126 may be from a single base station or multiple base stations. As discussed below with reference to FIG. 1C, for example, the first portion 132 is transmitted from a first base station over the first carrier 107 and the second portion 132 is transmitted from the second base station over a second carrier 108.

Figure 1B:
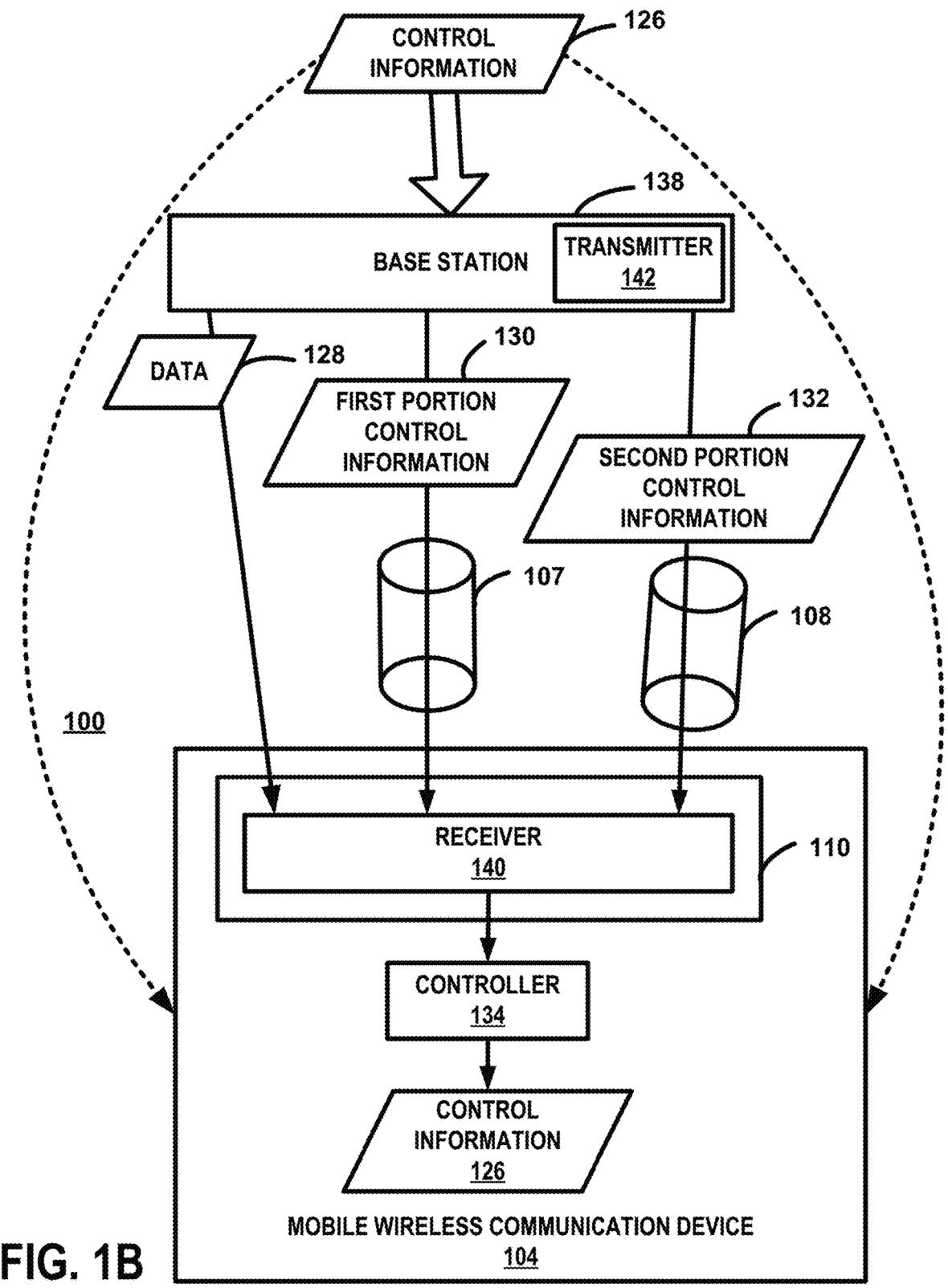
FIG. 1B is a block diagram of the communication system where the first frame and the second frame are transmitted from a single base station.

FIG. 1B is a block diagram of the communication system 100 where the control information 126 is transmitted from a single base station 138. The base station 138 transmits the first portion of the control information 130 in the first frame 111 over the first carrier 107 and the second portion of the control information 132 in the second frame 112 over the second carrier 108. The transmission of the first frame 111 and the second frame 112 is synchronized. The base station 138 may include multiple transmitters or may include a single transmitter capable of transmitting multiple carriers. The controller 136 that separates the control information 126 in the portions 130, 132 may be a network controller or a base station controller depending on the particular implementation. A receiver 140 in the transceiver 110 of the wireless communication device 104 receives the multiple carriers 107, 108. After any required demodulation, descrambling, and decoding, the portions of the control information are combined to reconstruct the control information 126. The control information 126 is used by the receiver 140 and controller 134 to receive the data 128. As described above, the data 128 is transmitted over the same carrier 108 and subframe 116 as the second portion 132 of the control information. In some circumstances, however, the data 128 may be transmitted over a different carrier and/or different subframe.

Figure 1C:
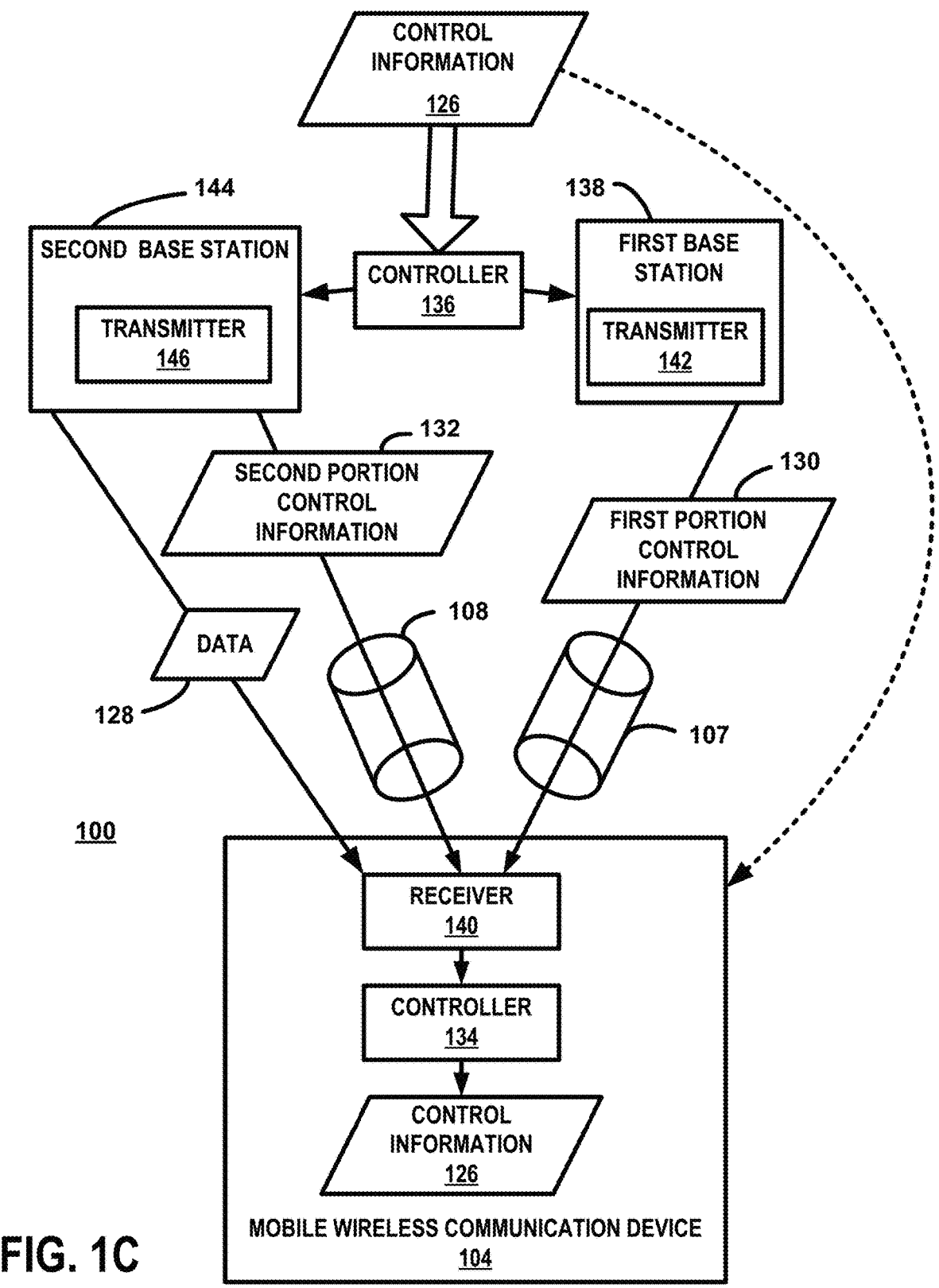
FIG. 1C is a block diagram of the communication system where the first frame is transmitted from a first base station and the second frame is transmitted from a second base station.

FIG. 1C is a block diagram of the communication system 100 where the control information 126 is transmitted from two base stations 138, 142. The controller 136 that separates the control information 126 in the portions 130, 132 is a network controller in the example discussed with reference to FIG. 1C. The controller 136, however, may be a base station controller in one of the base stations 138, 142 or may be distributed over multiple controllers. In such implementations, communication channels are established between the controllers and base stations to provide adequate transfer of information. The receiver 140 in the transceiver 110 of the wireless communication device 104 receives the multiple carriers 107, 108 from the two base stations 138, 142. After any required demodulation, descrambling, and decoding, the portions of the control information are combined to reconstruct the control information 126. The control information 126 is used by the receiver 140 and controller 134 to receive the data 128. As described above, the data 128 is transmitted over the same carrier 108 and subframe 116 as the second portion 132 of the control information. In some circumstances, however, the data 128 may be transmitted over a different carrier and/or different subframe or may be transmitted from a third base station (not shown).

Figure 2:
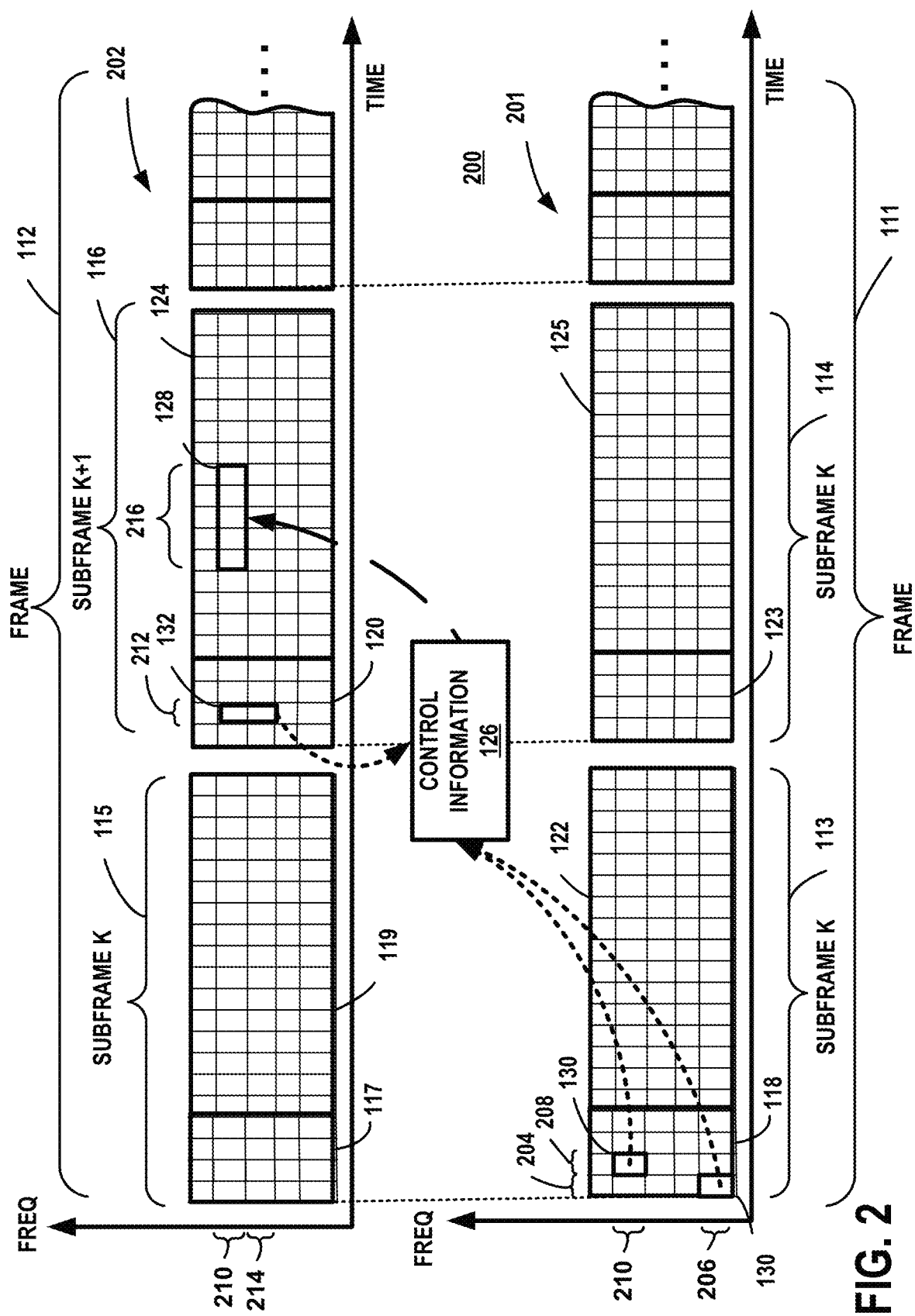
FIG. 2 is a graphical illustration of the first frame and the second frame with a plurality of resource elements.

FIG. 2 is a block diagram of the frames 111, 112 in a frequency-time graph 200 showing frequency-time resource elements 201, 202. The graph 200 in not necessarily drawn to scale and only provides an exemplary visual representation. Numerous other combinations of resource elements may be used to transmit the control information 126 and the data 132.

The first frame 111 includes a plurality of subframes including at least a first subframe (K) 113 and a first frame second subframe (K+1) 114. The second frame 112 includes a plurality of subframes including at least a second frame first subframe (K) 115 and a second subframe (K+1) 114. The frequency carriers 107, 108 used for transmission are each divided into a plurality of subcarriers. Transmissions is also divided in time to define a plurality of times slots where the time slots are further divided into symbol times. For LTE communication specifications, each time slot includes seven symbol times. The combination of symbol times and subcarriers defines resource elements 201, 202 of the first frame 111 and second frame 112, respectively. Accordingly, a symbol transmitted over a subcarrier is a resource element. Each portion of control information 130, 132 transmitted in a subframe is transmitted using one or more resource elements. The resource elements used for transmission of related information may or may not be contiguous. For the example of FIG. 2, the first portion of control information 130 is transmitted using first symbols 204 over a first subcarrier 206 and second symbols 208 over a second subcarrier 210 in the first subframe 113. The second portion of the control information 132 is transmitted using third symbols 212 over the second subcarrier 210 and a third subcarrier 214 in the second subframe 116 of the second frame 112. The data 128 is transmitted using fourth symbols 216 over the second subcarrier 210 in the second subframe 116. As explained above, at least some of the control information in the first portion 130 and at least some of the control information of the second portion 132 are required to reconstruct the control information 126. For example, the controller 134 in the wireless communication device 104 may be able to reconstruct the control information 126 from successful reception of only the information transmitted in the second subcarrier and third subcarrier. For such a situation, corruption of the first symbols 204 transmitted over the first subcarrier 206 would not hinder the wireless communication device from receiving the control information 126 and consequently accurately receiving the data 132.

Figure 3:
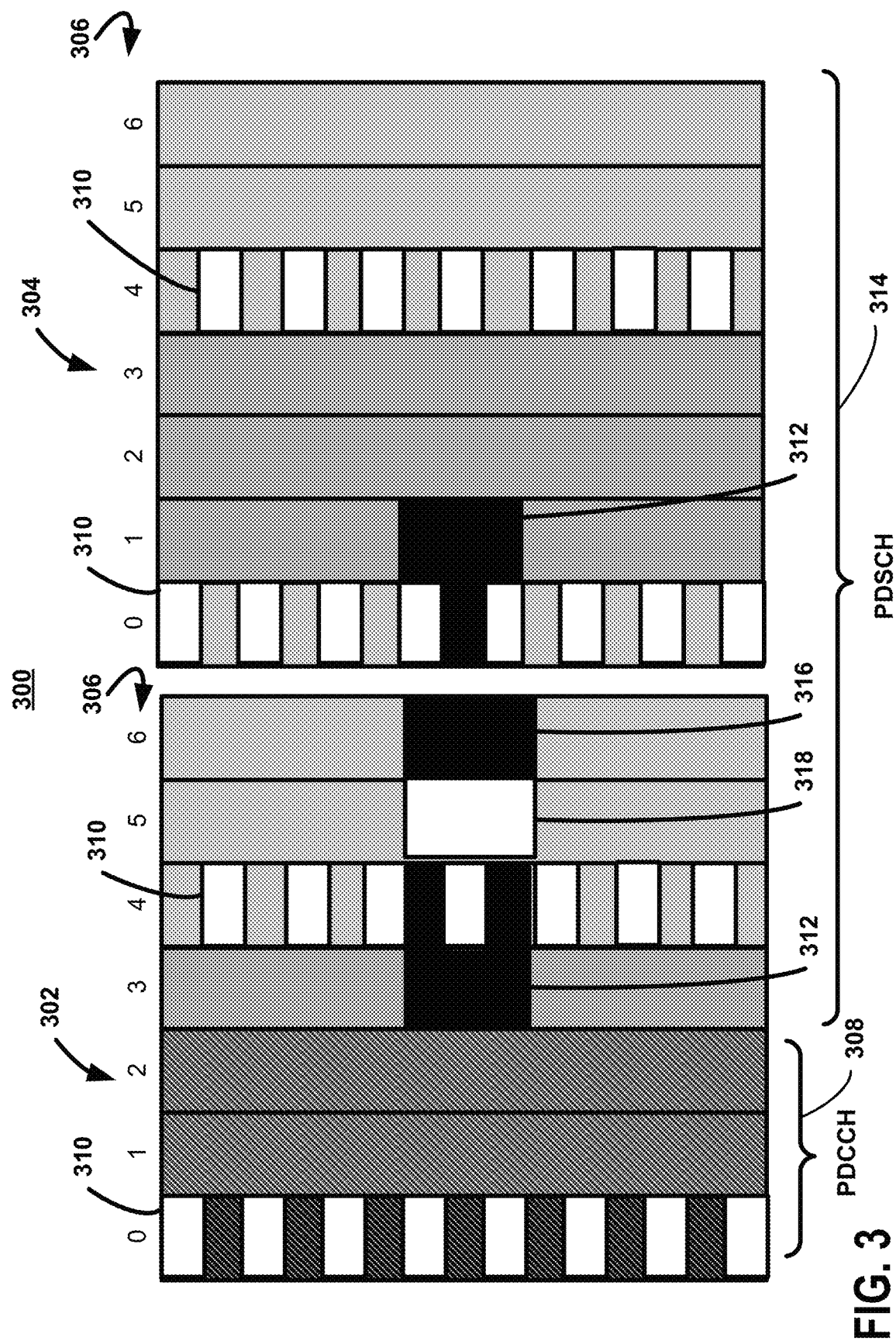
FIG. 3 is an illustration of a sub-frame in accordance with a 3GPP Long Term Evolution (LTE) communication specification.

FIG. 3 is an illustration of a subframe 300 in accordance with a 3GPP LTE communication specification. The subframe 300 includes two slots 302, 304, where each slot includes seven symbol times 306. The symbol times 0, 1 and 2 in the first slot 302 form the physical control channel 117, 118, 120, 123 which is a Physical Downlink Control Channel (PDCCH) 308. Pilot signals (or Reference Signals) 310 are injected at symbol times 0 and 4. The subframe 300 includes a broadcast channel that is a Physical Broadcast Channel (PBCH) 312 and spans portions of symbol times 3 and 4 of the first slot 302 and portions of symbol times 0 and 1 of the second slot 304. The data channel 119, 122, 124, 125 is a Physical Downlink Shared Channel (PDSCH) 314 and is covered by the remainder of symbol times 3-6 of the first slot 302 and symbol times 1-6 of the second slot 304. The sub-frame 300 also includes a primary synchronization channel (P-SCH) 316 and a secondary synchronization channel (S-SCH) 318.

In an example where the control information 126 is transmitted in accordance with the 3GPP LTE communication specification, therefore, a first portion of the control information 130 is transmitted within symbol time 1 and/or symbol time 2 within the first and second subframes. As described above, the resource elements may be contiguous or noncontiguous within a subframe. The data 128 transmitted in the second subframe is transmitted over symbol times 3, 4, 5, and/or 6 of the first slot 302 and/or symbol times 1, 2, 3, 5, and/or 6 of the second slot 304.

Figure 4:
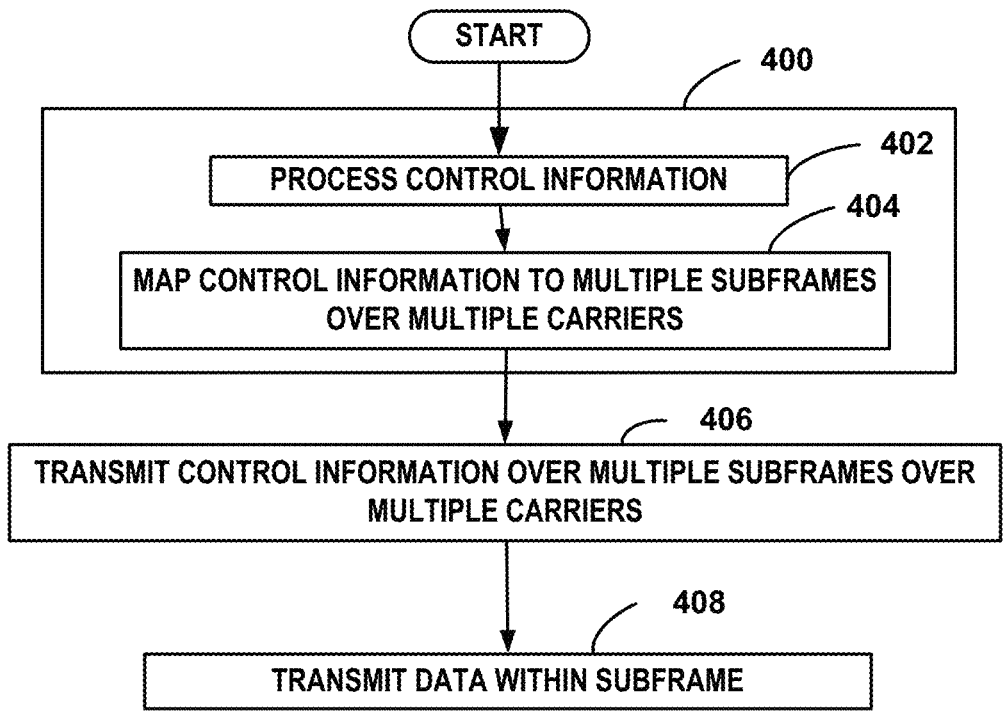
FIG. 4 is a flow chart of a method performed at the communication system infrastructure.

FIG. 4 is a flow chart of a method performed at the communication system infrastructure 102. Although the method may be performed using any combination of code and/or hardware, the method is facilitated by executing code on the controller 136 in the exemplary embodiment.

At step 400, the control information is separated into portions and assigned to a plurality of subframes. The separation may include processing, scrambling, coding and mapping in accordance with known techniques of downlink physical channel processing. For the example of FIG. 4, step 400 includes processing the control information at step 402 and mapping the control information to multiple subframes at step 404. Mapping may include, antenna ports processing (related to MIMO/SDMA), and resource element mapping within Frequency-Time space as well as other processing. The processing and mapping results in error coding of the control information and distribution of the control information 126 over multiple subframes in subframes that are transmitted over different carriers. As discussed above, for example, a first portion 130 is mapped to a first physical control channel 118 of a first subframe 113 of the first frame 111 and a second portion 132 is mapped to a second physical control channel 120 of a second subframe 116 of a second frame, where the data 128 to which the control information 126 corresponds is within a physical data channel 124 of the second subframe 116. The processing may also include scrambling of the control information 126 before and/or after the control information 126 is divided into portions.

At step 406, the control information is transmitted over multiple subframes over multiple carriers. Based on the mapping and processing, downlink OFDM signals 107, 108 are generated and transmitted from the communication system infrastructure 102 to the wireless communication device 104. As discussed above, a frame 111 is transmitted within the signal on the first carrier 107 and another frame 112 is transmitted within the signal on the second carrier 108, where each of the two frames has a plurality of time-frequency resource elements arranged in a plurality of subframes. The subframes include at least the first subframe 113 and the second subframe 116. Accordingly, a first portion of the control information 130 is transmitted in a physical control channel in a first subframe 113 in a first frame 111 over a first carrier 107 and a second portion of the control information 132 is transmitted in a physical control channel in a second subframe 116 in a second frame 112 over a second carrier 108.

At step 408, the data 128 is transmitted within the second subframe 116. Since the second portion 132 and the data 128 are transmitted within the same subframe, step 406 and step 408 are performed simultaneously. In some situations, the data 128 is transmitted over third carrier and/or a third subframe.

Figure 5:
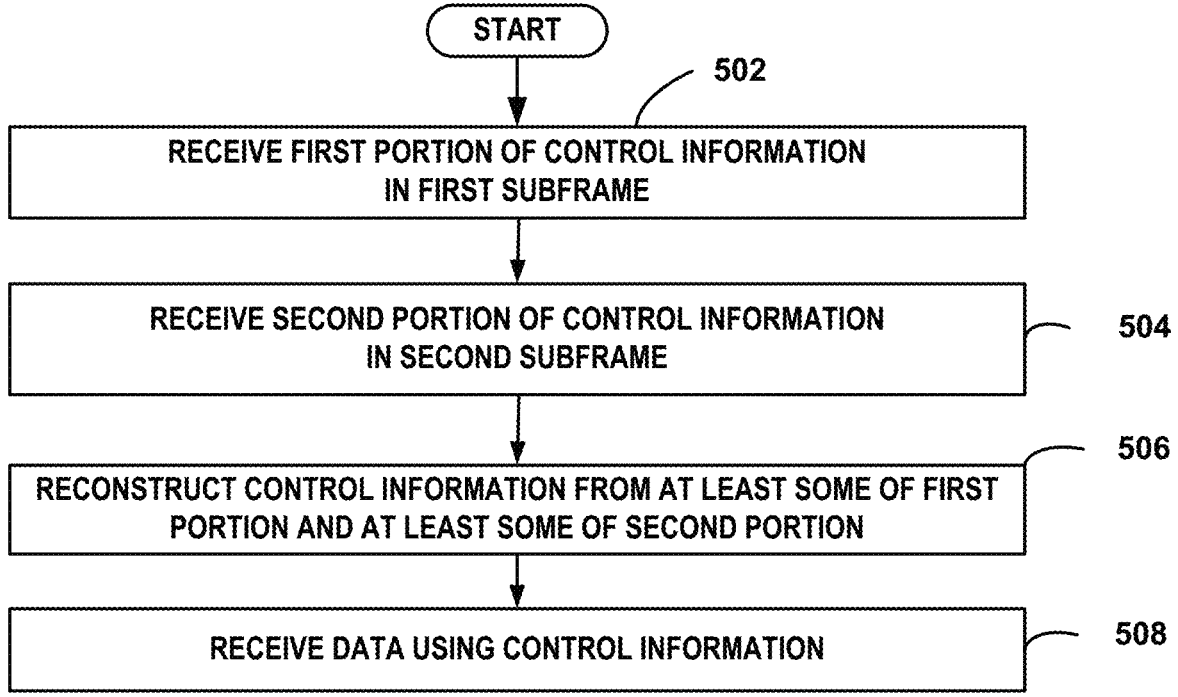
FIG. 5 is a flow chart of a method performed at a mobile wireless communication device.

FIG. 5 is a flow chart of a method performed at the wireless communication device 104. Although the method may be performed using any combination of code and/or hardware, the method is facilitated by executing code on the controller 134 within the wireless communication device 104 in the exemplary embodiment.

At step 502, the first portion of the control information 130 is received within the first subframe 113. The receiver within the wireless communication device 110 receives the OFDM signal over the first carrier 107 where the signals includes the first frame 111, the first subframe 113 and the first portion of the control information 130.

At step 504, the second portion of the control information 132 is received within the second subframe 116. The receiver 140 receives OFDM signal over the second carrier 108 where the signal includes the second frame 112, the second subframe 116 and the second portion of the control information 132. The signal is demodulated, decoded and otherwise processed, to receive the first and second portions 130, 132 of the control information 126. The first frame 111 and the second frame 112 are synchronized and are simultaneously received.

At step 506, the control information 126 is reconstructed from at least some of the first portion 130 and at least some of the second portion 132. The portions may require additional processing in some circumstances in order to reconstruct the control information. Where the control information has been error coded or scrambled across the subframes, descrambling and error decoding is applied to the received portions to retrieve the control information. As discussed above, in some circumstances, the control information 126 is retrieved with only some of the information of the first portion 130 and some information of the second portion 132. If the control information 126 is scrambled, it is also descrambled by the receiver and/or the controller.

At step 508, the data 128 is received using the control information 126. The receiver and controller 134 apply the control information 126 to accurately decode, demodulate, and otherwise process the data 128 in the second subframe 116.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A wireless communication device comprising:
    a receiver configured to receive a first subframe having a first physical control channel comprising first control information and a second subframe having a second physical control channel comprising second control information, wherein the first subframe and the second subframe do not overlap in a time direction, and both the first control information and the second control information are associated with a third physical data channel comprising data; and
    a controller configured to obtain the data from the third physical data channel, using at least one of the first control information and the second control information.

2. The wireless communication device of claim 1, wherein the third physical data channel is transmitted on another subframe different from the first subframe.

3. The wireless communication device of claim 1, wherein the receiver is further configured to receive the first subframe and the second subframe from a base station.

4. A method for a wireless communication device comprising:
    receiving a first subframe having a first physical control channel comprising first control information and a second subframe having a second physical control channel comprising second control information, wherein the first subframe and the second subframe do not overlap in a time direction, and both the first control information and the second control information are associated with a third physical data channel comprising data; and obtaining the data from the third physical data channel, using at least one of the first control information and the second control information.

5. The method for a wireless communication device of claim 4, wherein receiving the first subframe and the second subframe comprises receiving the first subframe and the second subframe from a base station.

6. A base station comprising:

a transmitter configured to transmit a first subframe having a first physical control channel comprising first control information and a second subframe having a second physical control channel comprising second control information, wherein the first subframe and the second subframe do not overlap in a time direction, both the first control information and the second control information are associated with a third physical data channel comprising data, and the data is obtained from the third physical data channel using at least one of the first control information and the second control information.

* * * * *